(No Model.) 14 Sheets—Sheet 1.

ADALBERT BARON VON PODEWILS.
APPARATUS FOR MAKING FERTILIZERS.

No. 295,695. Patented Mar. 25, 1884.

(No Model.) 14 Sheets—Sheet 2.

ADALBERT BARON VON PODEWILS.
APPARATUS FOR MAKING FERTILIZERS.

No. 295,695. Patented Mar. 25, 1884.

Attest:
Franz Prein
Josef Kinbach

Inventor.
Adalbert Baron von Podewils (No Model.) 14 Sheets—Sheet 4.
ADALBERT BARON VON PODEWILS.
APPARATUS FOR MAKING FERTILIZERS.
No. 295,695. Patented Mar. 25, 1884.

(No Model.) 14 Sheets—Sheet 6.

ADALBERT BARON VON PODEWILS.
APPARATUS FOR MAKING FERTILIZERS.

No. 295,695. Patented Mar. 25, 1884.

(No Model.) 14 Sheets—Sheet 7.

ADALBERT BARON VON PODEWILS.
APPARATUS FOR MAKING FERTILIZERS.

No. 295,695. Patented Mar. 25, 1884.

fig.11.

Attest,
Franz Priem
Josef Linhady

Inventor:
Adalbert Baron von Podewils (No Model.) 14 Sheets—Sheet 8.

ADALBERT BARON VON PODEWILS.
APPARATUS FOR MAKING FERTILIZERS.

No. 295,695. Patented Mar. 25, 1884.

fig.12.

(No Model.) 14 Sheets—Sheet 9.

ADALBERT BARON VON PODEWILS.
APPARATUS FOR MAKING FERTILIZERS.

No. 295,695. Patented Mar. 25, 1884.

Attest

Franz Priem
Josef Hrubacy

Inventor

Adalbert Baron von Podewils (No Model.) 14 Sheets—Sheet 10.

ADALBERT BARON VON PODEWILS.
APPARATUS FOR MAKING FERTILIZERS.

No. 295,695. Patented Mar. 25, 1884.

(No Model.) 14 Sheets—Sheet 12.

ADALBERT BARON VON PODEWILS.
APPARATUS FOR MAKING FERTILIZERS.

No. 295,695. Patented Mar. 25, 1884.

(No Model.) 14 Sheets—Sheet 13.

ADALBERT BARON VON PODEWILS.
APPARATUS FOR MAKING FERTILIZERS.

No. 295,695. Patented Mar. 25, 1884.

fig. 18.

Attest,
Franz Priem
Josef Kambech

Inventor:
Adalbert Baron von Podewils.

(No Model.) 14 Sheets—Sheet 14.

ADALBERT BARON VON PODEWILS.
APPARATUS FOR MAKING FERTILIZERS.

No. 295,695. Patented Mar. 25, 1884.

UNITED STATES PATENT OFFICE.

ADALBERT BARON VON PODEWILS, OF MUNICH, BAVARIA, GERMANY.

APPARATUS FOR MAKING FERTILIZERS.

SPECIFICATION forming part of Letters Patent No. 295,695, dated March 25, 1884.

Application filed May 10, 1883. (No model.)

*To all whom it may concern:*

Be it known that I, ADALBERT BARON VON PODEWILS, a citizen of the German Empire, residing at Munich, in the Kingdom of Bavaria, Germany, have invented certain new and useful Improvements in Process and Apparatus for Making Fertilizers, of which the following is a specification, reference being had therein to the accompanying drawings.

Figure 1:
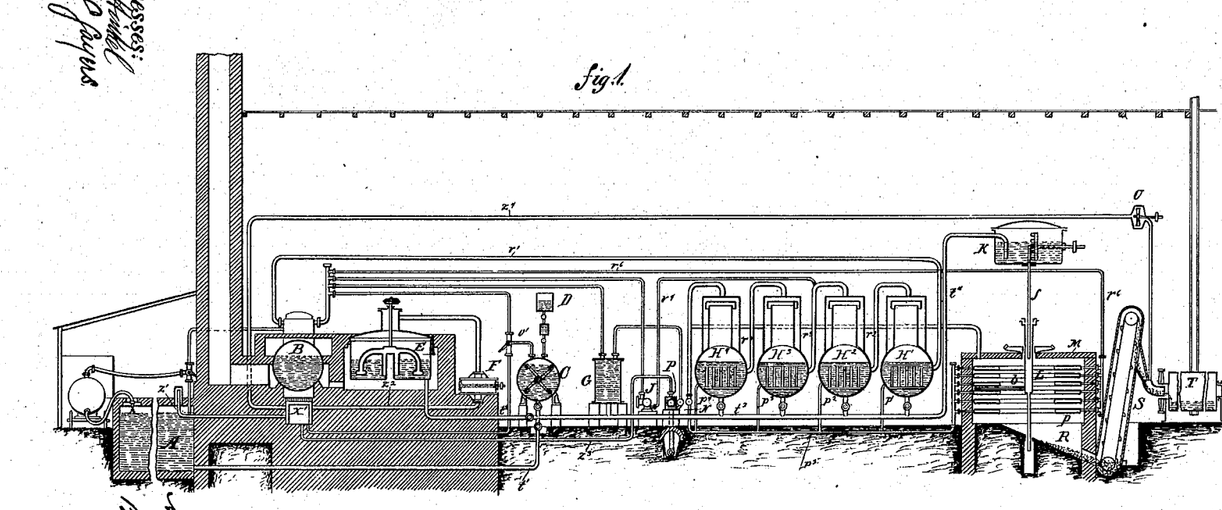

The present system for the preparation of fecal matter and industrial refuse has for its object to evaporate liquids with the smallest possible consumption of fuel, and to reduce the residue to a fine powder. At the same time a perfect disinfection of liquids capable of putrefaction is effected by the addition of acid, smoking, and heating above 100° Celsius. The apparatus used is represented in full in Figure 1. The materials are collected in the reservoir A. The air contained in the reservoir A escapes through the pipe $z$ into the fire-place $x'$ of the steam-boiler B. By means of the injector $v'$ pressure or vacuum may be produced in the mixing-drum C. This causes the materials to pass from the reservoir A through the pipe $t'$ into the mixing-drum C. There a fixed quantity of acid from the acid-tank D is added to take up the ammonia. By means of the injector $v'$ the materials are then forced from the mixing-drum C through the pipe $t^2$ into the smoking apparatus E. In this apparatus part of the smoke from the fire-place $x'$ is passed through the mass by the exhaust action of a blower, F. The smoke and gases drawn through the mass are returned to the fire-place $x'$ through the pipe $z^2$. In the smoking apparatus the fecal matters are deodorized, and all the gases given off from the liquid are drawn off. From the smoking apparatus the fecal matters are transferred into evaporating apparatus by means of the pump G, to be subjected to an evaporation in the series of evaporating-tanks H' H² H³ H⁴. The evaporators, whose construction varies with the consistency of the matters to be evaporated, work at various temperatures—partly above atmospheric pressure, partly with a vacuum. The evaporator H' is heated by direct steam from the boiler passing through a pipe, $r'$. In this apparatus H' the fecal matters are heated to about 120° Celsius at two atmospheres above atmospheric pressure. The vapors generated in the evaporator H' from the fecal matters pass through a pipe, $r^2$, to and heat the evaporator H². In this apparatus the materials are heated to 100° Celsius. The evaporator H³, working at a vacuum, is heated by the vapors generated in the apparatus H², passing through a pipe, $r^3$, and by the exhaust-steam of an engine, J, passing through a pipe, $r^4$. The evaporator H⁴ is heated by the vapors from the apparatus H³ passing through the pipe $r^5$. When the fecal matters are reduced in these evaporators to a thick liquid, they are, by means of the pump G, discharged through the pipe $t^3$ $t^4$ into the elevated reservoir K. From this they pass into the hollow shaft L of the drying-machine M. In the drying-machine M the fecal mass is made perfectly dry upon horizontal annular flat hollow casings $p$, which are heated by direct steam from the boiler B passing through a pipe, $r^6$. The fecal mass dried upon the plates of the drying-machine M is, by means of a rotary knife, $b$, thrown into a passage, R, and thence is carried by a bucket-elevator, S, to the pulverizing apparatus T. The latter may be a disintegrator of any suitable construction. The pulverizer is slightly ventilated by means of the fan U, and the air used for this purpose passes through the pipe $z^4$ to the fire-place of the boiler B. The whole of the vapors generated from the fecal matters within the evaporators H' H² H³ H⁴ and in the drying-machine M are condensed to water and pass through the pipes $p'$ $p^2$ $p^3$ $p^4$ $p^5$ into the condenser N', where they are mixed with spring-water and run off through the pipe O. All the gases generated from the fecal matters during evaporation and drying are drawn off by the air-pump P and pass through the pipe $z^3$ to the fire-place of the boiler B.

Having described the general arrangement of the apparatus, I will now specify the construction of the several parts in detail.

Figure 2:
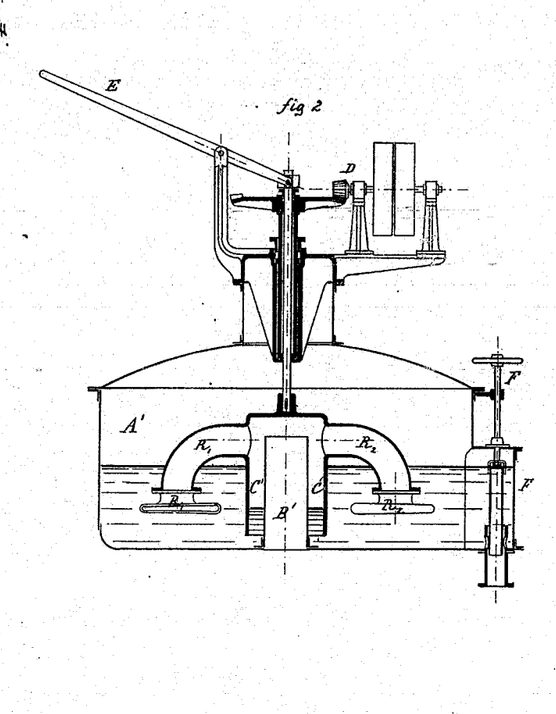
Figure 3:
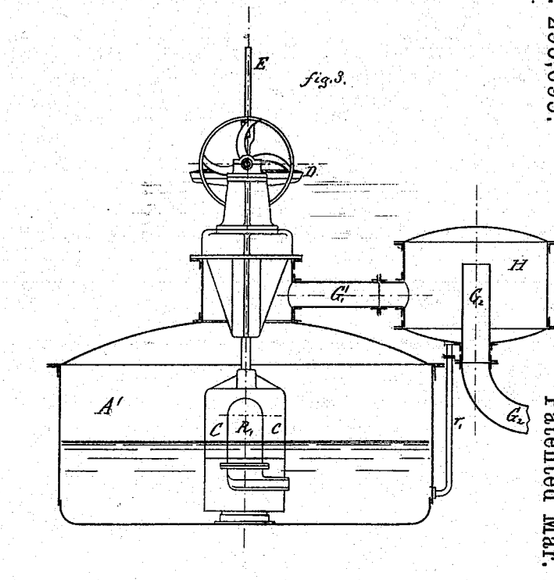
Figure 4:
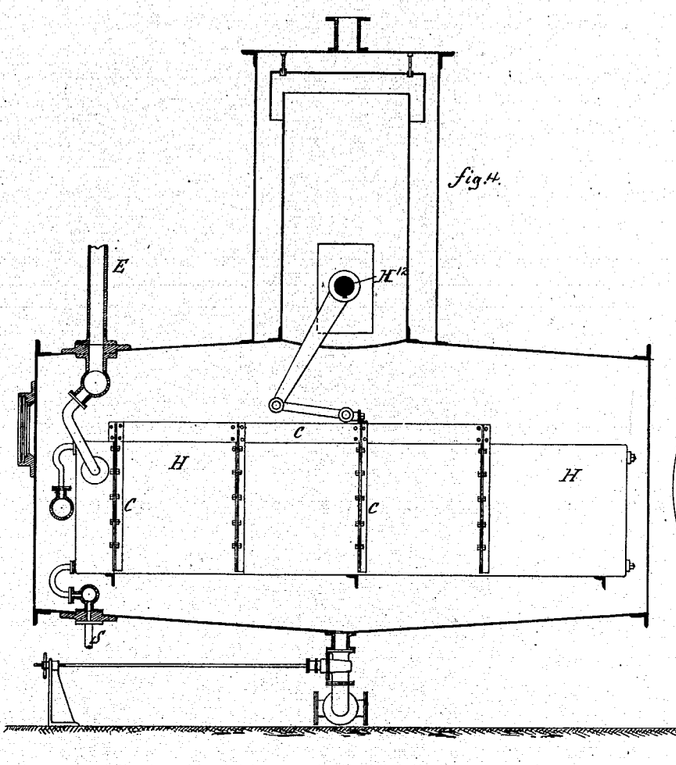
Figure 5:
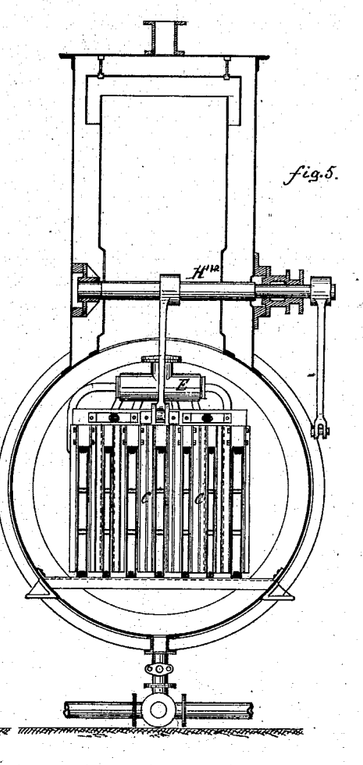
Figure 6:
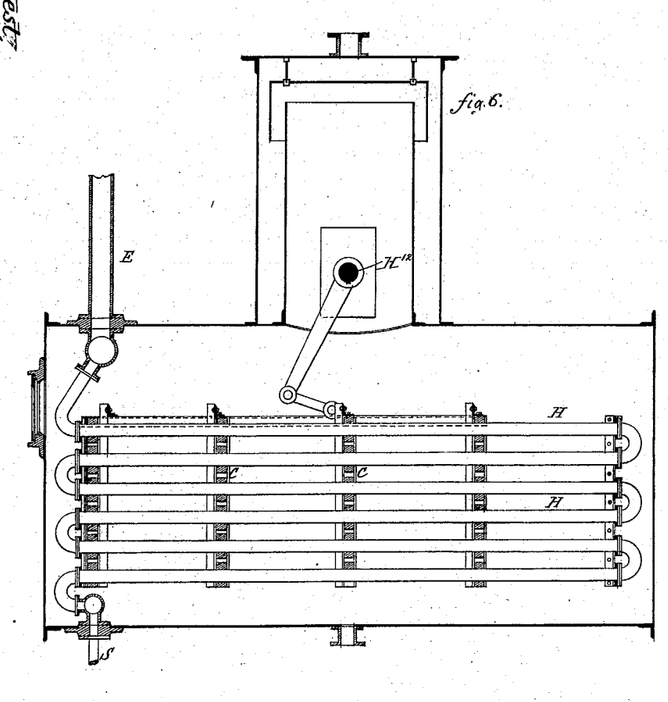
Figure 7:
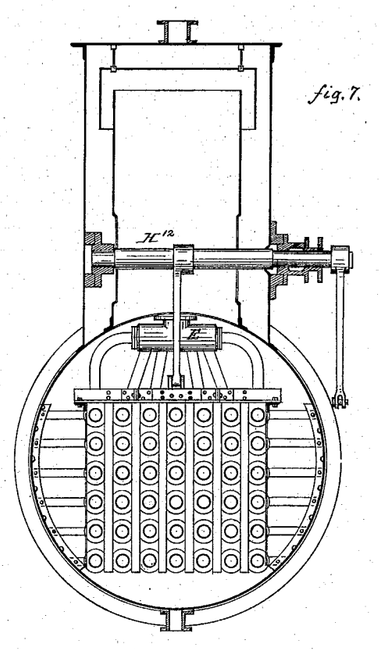
Figure 8:
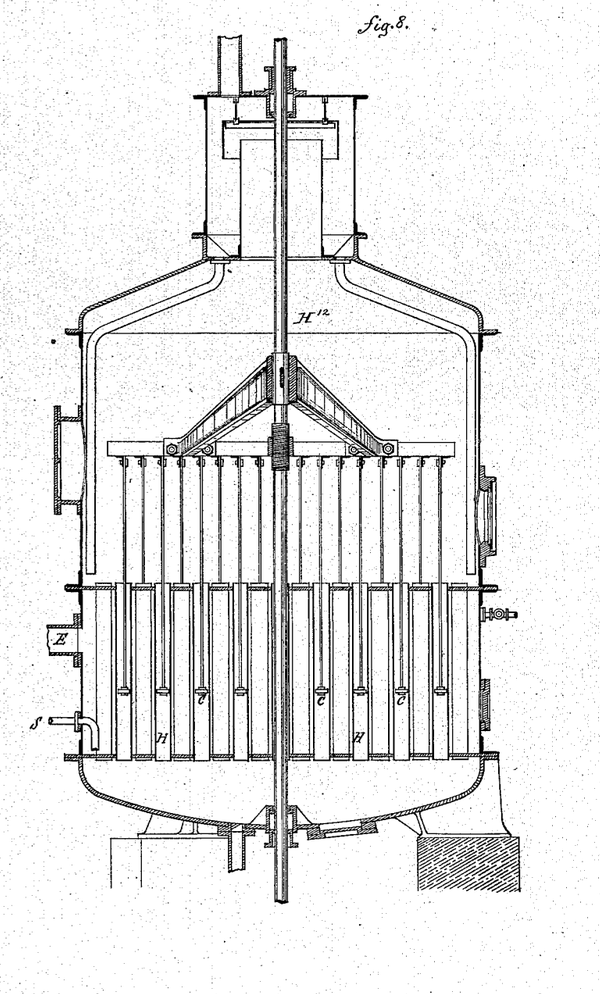
Figure 9:
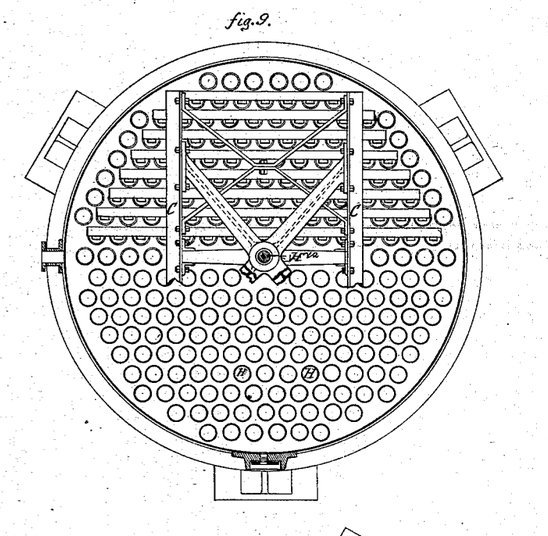
Figure 10:
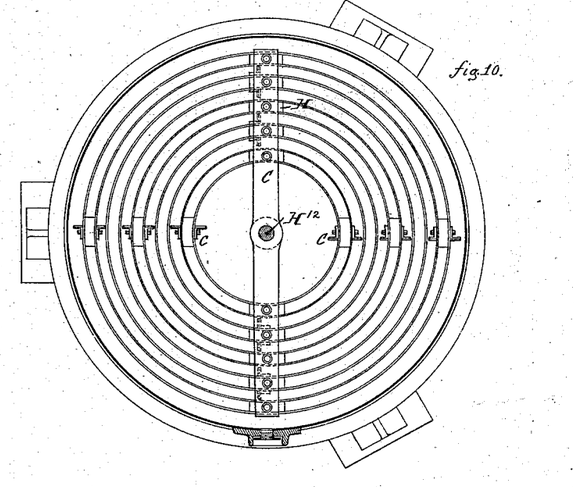
Figure 11:
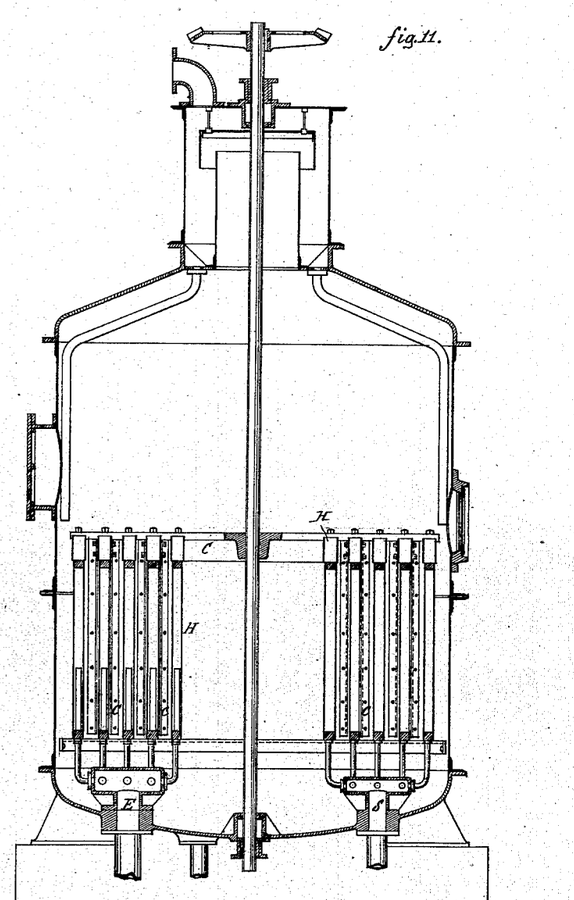
Figure 12:
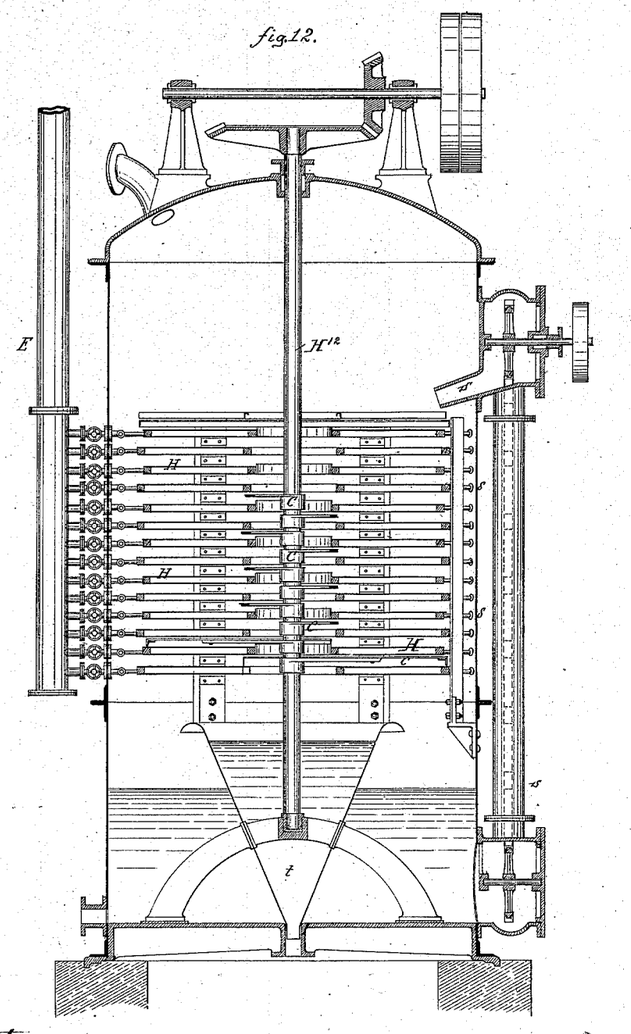
Figure 13:
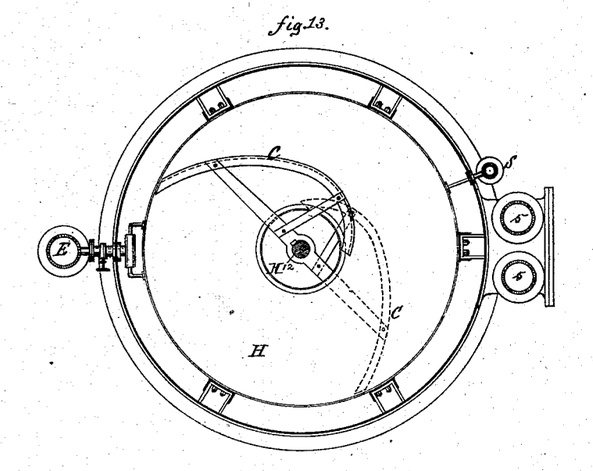

*The smoking apparatus, Figs. 2 and 3.*—The liquid to be smoked and evaporated is retained within the pan or tank A'. To the bottom of this pan the vertical pipe B' is attached, above which the bell C' is freely suspended. This bell carries any number of arms or downwardly-curved pipes R' R², which at their lower ends are turned at an angle of ninety degrees, Fig. 3, to form nozzles extending in a direction contrary to the direction of motion of the bell C. The bell, with its said arms, is rotated from the outside by means of gears D. The construction is such that during operation the bell may be vertically adjusted by means of a lever, E. A likewise adjustable overflow, F, Fig. 2, allows the level of the liquid to be changed. The gases to be mixed with it are either forced into the stand-pipe B' by means of blowing-engines, and then enter the liquid through the downwardly-curved arms R' R² of the bell C, or the blowing-engine draws the gases off through the outlet-conduit G' G², thereby creating a vacuum in the pan A', so that the pressure of the external air forces the gases through the revolving arms R' R² of the bell C, or finally the speed of the bell is so much increased as to make it act as an aspirator. The facility of changing the degree of immersion of the bell C during operation is of particular importance when the gases to be absorbed change their composition. When they are used for smoking fecal matters, the bell C is lowered as much as possible, when fresh fuel is added, to obtain a perfect utilization of the smoke generated at this instant. When combustion has gradually become more perfect, a lesser depth of immersion is sufficient to absorb the small quantity of products of dry distillation. To retain particles of liquid which may be carried off, the collecting-drum H, Fig. 3, is provided, which allows the deposited liquid to return to the pan A through the pipe r.

Figure 14:
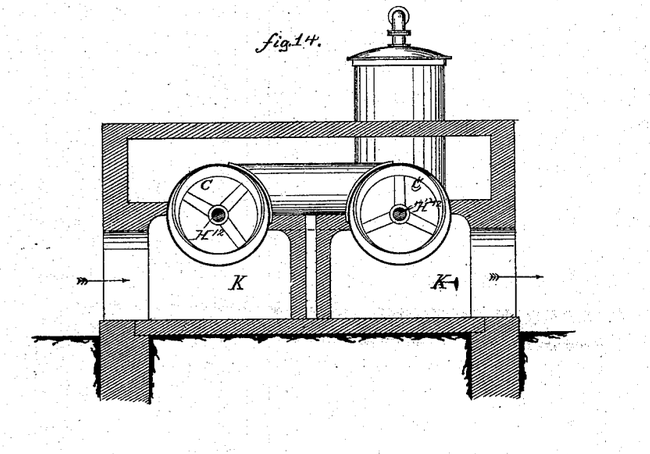
Figure 15:
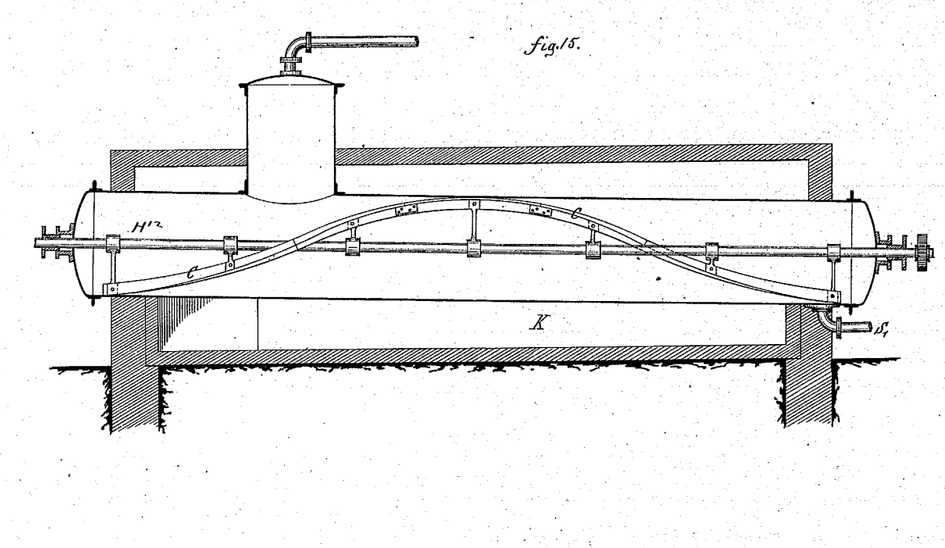

*Evaporating apparatus.*—The apparatus Figs. 4 to 15 serves to concentrate the liquid, in which, during evaporation, precipitates are formed, which deposit on the heating-surfaces and impair their efficiency. The evaporators are provided with scraping mechanism with fixed rigid or yielding scrapers, which, at intervals or continuously, glide to and fro on the heating-surfaces, and in this manner prevent the formation of incrustations on the heating-surfaces. In the drawings the scrapers are designated by C, and are moved back and forth in contact with the faces of the heater-casings by connections with a shaft, H¹², the heaters by H, the steam-pipe by E, the discharge-pipe for condensed water by S. The evaporators are cylindrical upright or horizontal boilers, in which the heaters are placed. These heaters consist either of straight double-walled casings, Figs. 4 and 5, or of curved casings, Figs. 10 and 11, or of systems of pipes, Figs. 6, 7, 8, and 9. The heaters of the evaporators, Figs. 4 to 11, are entirely submerged in the liquid to be evaporated; but in the heaters of the evaporator shown in Figs. 12 and 13 the liquid to be concentrated is poured upon from above by some mechanism, (a bucket-elevator, s, in the drawings.) The scrapers C of this evaporator, Fig. 12, fit exactly between the horizontal casings H and push the liquid to be concentrated from one casing to the other, and finally into the funnel t below, whence the concentrated liquid is removed from time to time. Figs. 14 and 15 represent another evaporating-apparatus, which is heated directly by the products of combustion. The gases pass under the boiler through the flues K. The scraping mechanism C is curved in the form of a screw, so that the precipitates are moved forward toward the discharge-pipe. In each of these modifications there is a heater-casing, H, of some form, a scraper moving over the surface thereof, and a shaft, H¹², from which motion is imparted to the scraper.

*Drying-machines.*—The drying-machines, Figs. 16 to 20, are to evaporate the concentrated liquids to perfect dryness without admixture of any dry substances. They consist of annular or square hollow plates or casings p, upon which the liquid is poured in uniform thin layers, and is scraped off mechanically by a tool or by a rotating knife, after it has been thoroughly dried without further mechanical treatment, simply through the action of the steam introduced into the plates. The thickness of the layer of liquid upon the plates is rendered adjustable by giving to the plates and to the supply-pipe b a relative motion toward each other during the pouring on of the liquid. This of course may be effected by turning or sliding of a plate beneath a fixed pipe or of the supply-pipe over a fixed plate.

Figure 17:
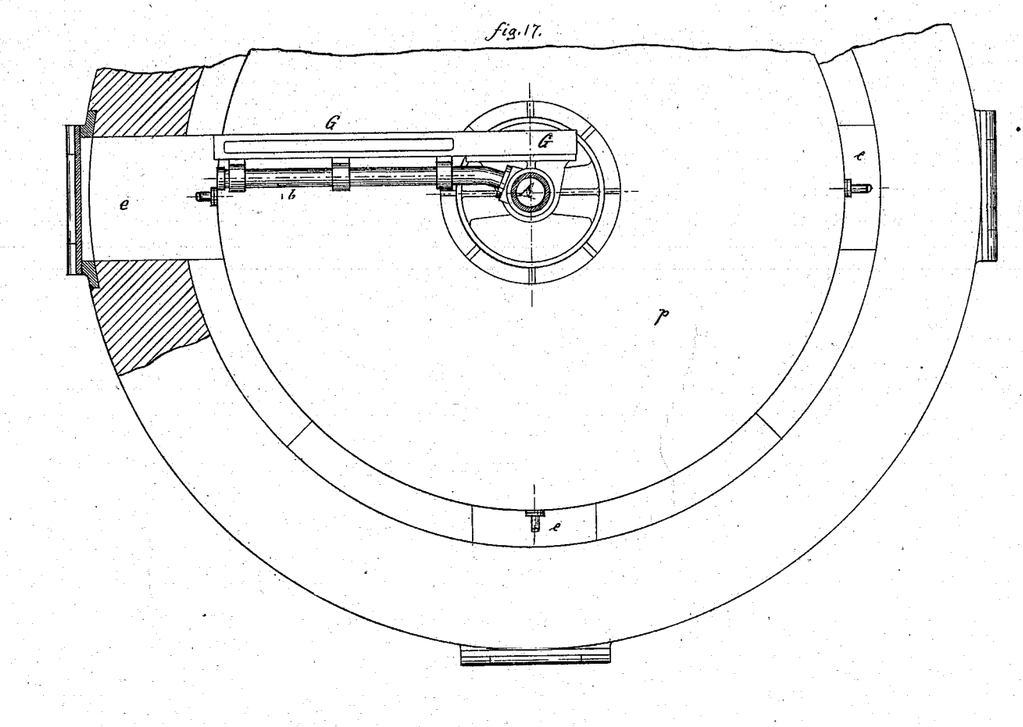

Figs. 16 and 17 show a simple apparatus with only one plate. The scraping-tool d consists of several knives, which, by springs or weighted levers, may be uniformly loaded, so that the several knives can adapt themselves to the surface. The knives are connected with the revolving supply-pipe b, by which the liquid is poured upon the surface, so that the spot cleaned by it is recharged with liquid at once. The knives are inclined, so that the dried matter is pushed outward into the discharge-shafts e. Motion is imparted to the apparatus by a worm-wheel, r. The liquid to be dried passes through the pipe f, with a stuffing-box, into the shaft A, and thence into the charging-pipe b.

Figure 18:
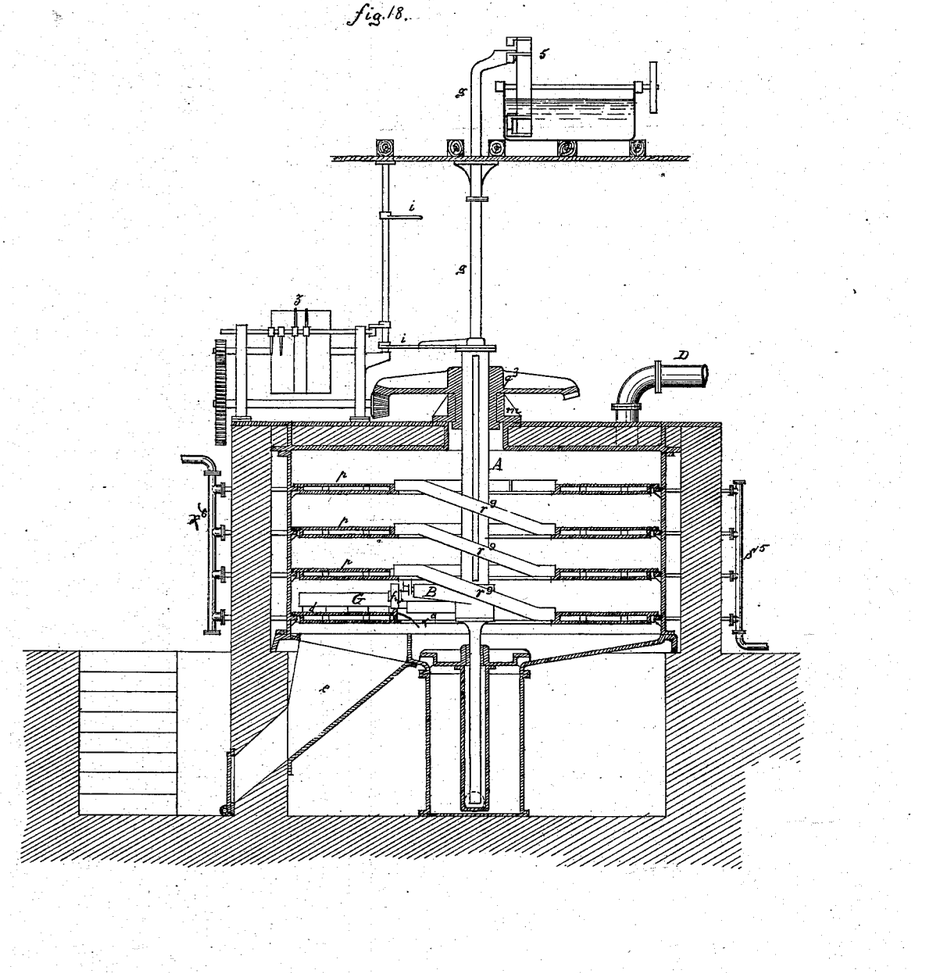
Figure 19:
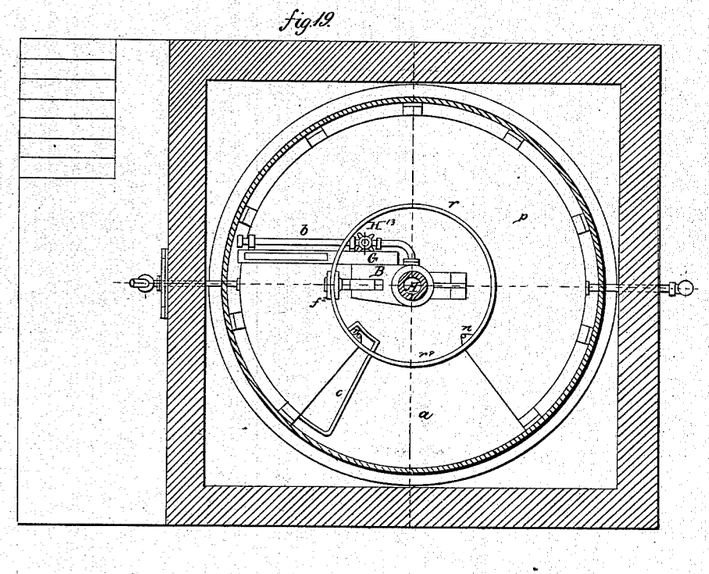
Figure 20:
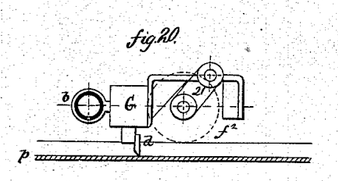
Figure 21:
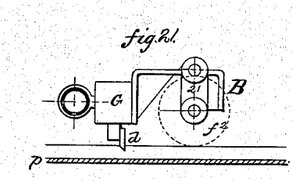

Figs. 18 and 19 show an apparatus with the several casings p arranged one above the other. These are not perfectly annular, but are cut away at a, Fig. 19. The roller-arm B, on which are also mounted the arm G, with the knives d, and the charging-pipe b, likewise carries the guide-roller f², which runs on the track r⁹, bolted to the casings p. The shaft is free to slide up and down in the key-seats of the hub g³ and in the bearing m, and when it revolves the arm G, with the knives, is, by means of the guide-roller f², carried from one casing to the other. In Figs. 20 and 21 the guide-roller is shown on a larger scale. Fig. 20 shows its position and that of the arm G, with knives d, and the charging-pipe b, on the downward course; Fig. 21, going upward. The shaft of the roller f is connected to the arm G by links 21, so that the arm is raised as the links approach a vertical position, Fig. 21. In the downward motion the weight of the shaft A acts on the knives, while during the ascent the knives $d$ are raised from the plates $p$, and the weight of the hollow shaft A rests upon the roller $f^2$. The change in the direction of motion is effected through an ordinary reversing apparatus with open or crossed belts, Fig. 18. By means of suitable apparatus—in this case a small bucket-wheel, 5—the liquid is poured into the pipe $g$, through which it passes into the hollow shaft A, and into the charging-pipe $b$. The latter is provided with a stop-cock, which, by means of the star-handle $H^{13}$ and the lugs $n$, Fig. 19, is operated in such a manner that the charging-pipe $b$ remains closed while passing over the notches $a$ of the casings. The knives push the dried material into the funnel $e$. The steam generated escapes through the pipe D. Steam for heating is admitted to the plates through the pipe $r^6$. The water of condensation is discharged through the pipe $S^5$.

It is evident that the track $r^9$ for the roller $f^2$ may be on the outside of the drying apparatus, above or below.

I do not here claim the process of treating fecal matter, as the same will constitute the subject of a separate application for Letters Patent; but

I claim—

1. The combination of the tank A′, pipe B′, communicating with a flue, revolving bell C′, and hollow arms R′ R², substantially as set forth.

2. The combination, with the tank and its pipe B′, of the bell C′, carrying hollow arms, and appliances for raising and lowering the bell, substantially as set forth.

3. The drying-tank provided with one or more shallow steam-casings, with traveling scrapers, and with a traveling feed-pipe, substantially as set forth.

In testimony whereof I affix my signature, in presence of two witnesses, this 21st day of July, 1882.

ADALBERT BARON VON PODEWILS.

Witnesses:
A. E. BARTHEL,
EMIL HENZEL.